July 15, 1958 A. B. HAMM 2,843,442
TACKLE BOX
Filed Aug. 6, 1956 2 Sheets-Sheet 1
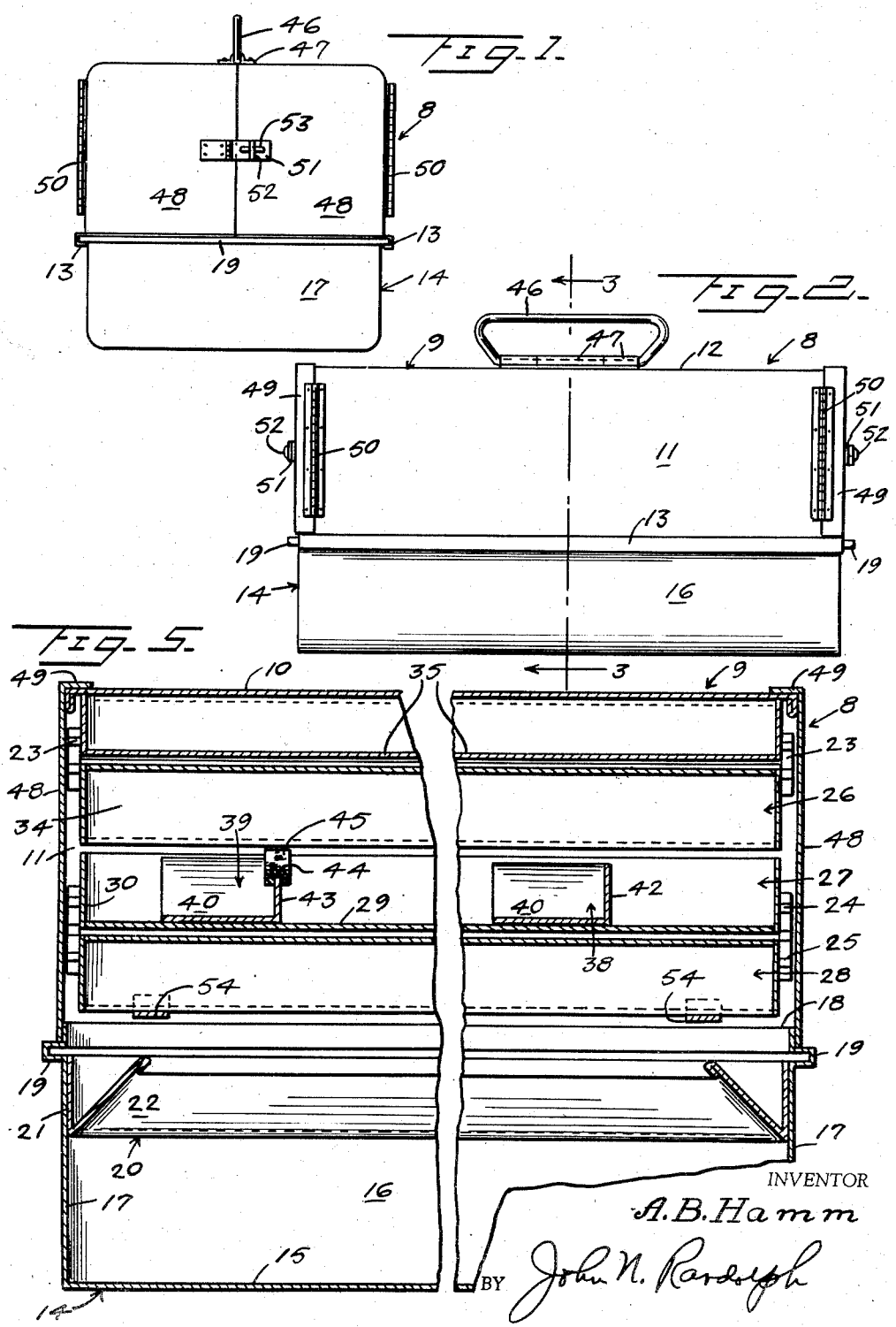
INVENTOR
A. B. Hamm
BY John N. Randolph
ATTORNEY July 15, 1958    A. B. HAMM    2,843,442
TACKLE BOX
Filed Aug. 6, 1956      2 Sheets-Sheet 2
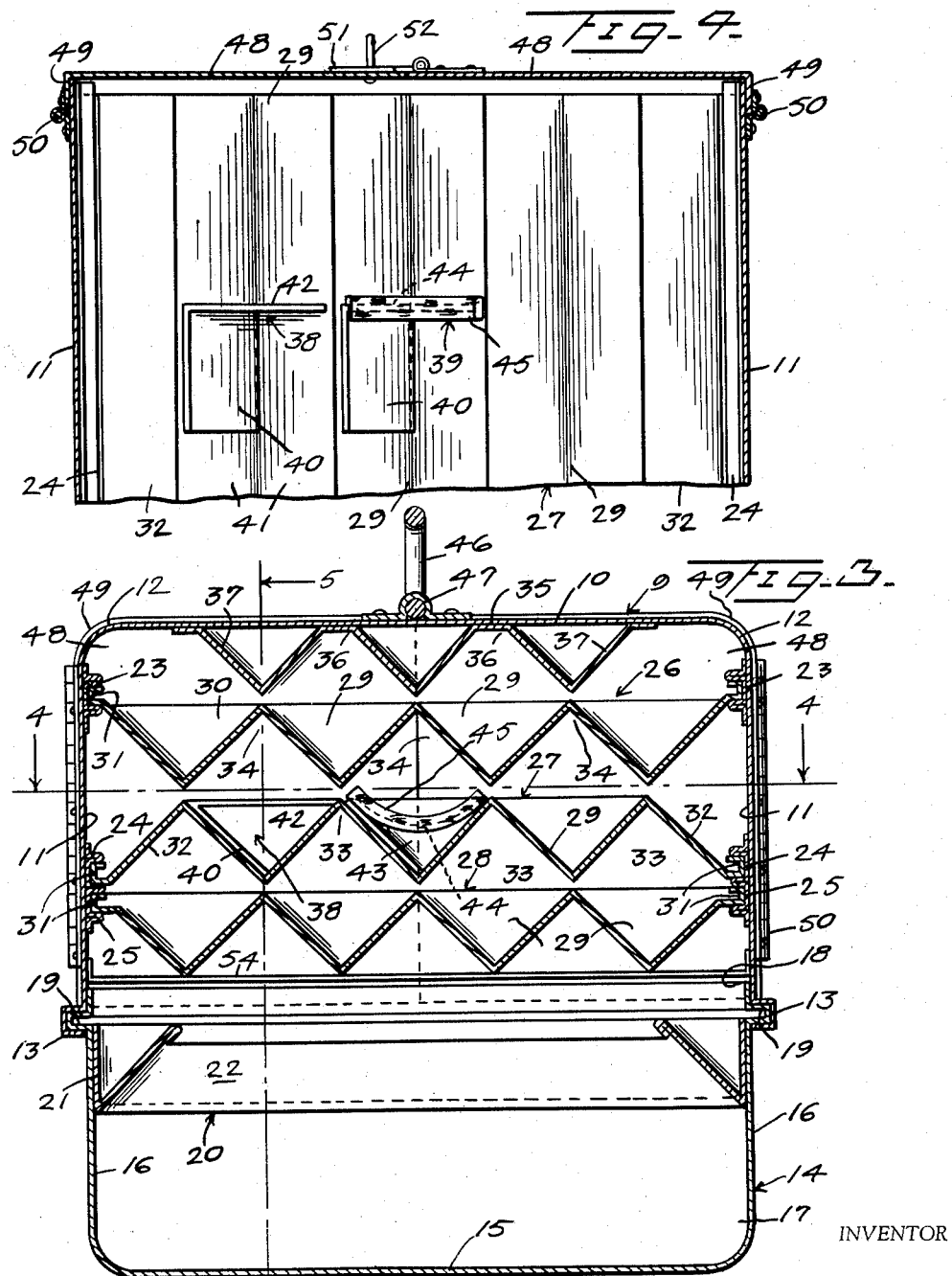
INVENTOR
A. B. Hamm
BY John N. Randolph
ATTORNEY United States Patent Office 2,843,442
Patented July 15, 1958

2,843,442

TACKLE BOX

Acey B. Hamm, Fort Worth, Tex.

Application August 6, 1956, Serial No. 602,319

2 Claims. (Cl. 312—311)

This invention relates to a fishing tackle box and has for a primary object to provide a fishing tackle box having a plurality of storage compartments which are slidably movable selectively to exposed positions to afford ready access to the contents thereof.

Another object of the invention is to provide a tackle box having a plurality of slidably mounted trays each having a number of channel shaped compartments for holding plugs and other artificial lures and wherein the several trays are so mounted relative to one another that the individual channel shaped compartments of one tray are closed by a tray disposed thereabove when the tackle box is closed.

A further object of the invention is to provide a tackle box including a bottom section which is slidably supported by a top section of the tackle box and wherein the top section has open ends provided with closures which function, when in a closed position, to retain the bottom section against sliding movement relative to the top section of the box, and which closures additionally function to retain trays which are slidably supported in the top section of the box against sliding movement relative thereto.

Various other objects and advantages of the invention will hereinafter become more fully apparent from the following description of the drawings, illustrating presently preferred embodiments thereof, and wherein:

Figure 1 is an end elevational view of the tackle box;

Figure 2 is a side elevational view thereof;

Figure 3 is an enlarged cross sectional view of the tackle box, taken substantially along a plane as indicated by the line 3—3 of Figure 2;

Figure 4 is a fragmentary horizontal sectional view of a part of the tackle box, taken substantially along a plane as indicated by the line 4—4 of Figure 3;

Figure 5 is a fragmentary longitudinal sectional view of the tackle box, taken substantially along a plane as indicated by the line 5—5 of Figure 3;

Figure 6 is a fragmentary cross sectional view of a modified construction of the slidable tray, and Figure 7 is a similar view of another modified form of the tray.

Referring more specifically to the drawings, the tackle box in its entirety and comprising the invention is designated generally 8 and includes an upper body section, designated generally 9, which is elongated and of arch shape in cross section, as best seen in Figure 3, and which includes a substantially flat top portion 10 and substantially parallel depending side walls 11, which are connected to the top portion 10 by rounded corners 12 which extend from end-to-end of the upper body portion 9. The side walls 11 at their bottom edges are provided with outwardly offset inwardly opening channels 13 which extend from end-to-end thereof.

The body portion of the tackle box 8 also includes an elongated open top receptacle 14 forming the bottom part of the tackle box and which is of a length substantially corresponding to the length of the top portion 9 and of a width only slightly less than the width of said top portion 9. The bottom portion 14 like the top portion 9 is formed of sheet material and includes a substantially flat bottom 15, substantially parallel sde walls 16, and substantially parallel end walls 17. The upper edges of the walls 16 and 17 combine to define the open top 18 of the bottom section 14, and said walls 16 and 17 have a continuous outwardly offset portion forming a continuous external rib 19 which is disposed around the bottom section 14, near to but spaced from its open top 18.

The bottom section 14 is also provided with an internal trough 20 which is disposed substantially above the bottom 15 thereof and which includes a continuous outer wall 21 which is disposed against and secured to the side walls 16 and end walls 17 of the bottom section 14 and the upper edge of which preferably terminates at approximately the level of the bottom of the rib 19, as seen in Figures 3 and 5. The trough 20 includes an inner wall 22 which extends upwardly and inwardly from the bottom edge of the outer wall 21 and which is preferably disposed at an angle of approximately 45° to said wall 21. The upper edge of the inner wall 22 is preferably disposed substantially coplanar with the upper edge of the outer wall 21.

The side walls 11 of the top section 9 are each shown as being provided with three guide channels 23, 24 and 25 for accommodating three trays 26, 27 and 28, respectively. Each of said trays is provided with a plurality of channels 29 of substantially V-shape cross section which extend substantially from end-to-end thereof, and said trays have end walls 30 for closing the ends of the channels or tray compartments 29, as best seen in Figure 5. The top tray 26 and the bottom tray 28 are identical and each includes four such channels or compartments 29. Said trays 26 and 28 have longitudinal side edge portions 31 which are turned upwardly and back upon themselves and the upper edges of which are disposed flush with the upper edges of the walls or channels 29 and the upper edges of the end walls 30. Said side edges 31 of the tray 26 slidably engage in the upper guide channels 23 of the walls 11 and the side edges 31 of the bottom tray 28 slidably engage in the guide channels 25 of the walls 11. The intermediate tray 27 is provided with three channels 29 and the side edge portions 31 thereof, which are of the same shape as the portions 31 of the trays 26 and 28, are downwardly offset with respect to the open tops of the tray compartments 29 of the tray 27 and are connected to the outer walls of the two outer compartments 29 of said tray 27 by outwardly and downwardly inclined wall portions 32. The side edge portions 31 of the tray 27 slidably engage the intermediate guide channels 24 for supporting the intermediate tray 27 between and slightly spaced from the trays 26 and 28 and with the compartments 29 of the tray 27 staggered relative to the compartments 29 of the trays 26 and 28. Thus, as seen in Figure 3, the four inverted V-shape portions 33 of the tray 27 are disposed directly over and provide covers for the four compartments 29 of the bottom tray 28 and the three inverted V-shape portions 34 of the top tray 26 are similarly disposed directly over and provide covers for the three compartments 29 of the intermediate tray 27.

An elongated strip 35 is folded lengthwise and has portions thereof secured to the underside of the top wall 10 to provide two inverted channel shape covers 36 which are disposed directly over the two intermediate compartments 29 of the top tray 26. Downwardly and inwardly inclined wall portions 37 of the strip 35 combine with side edge portions of the top wall 10 and the rounded corners 12 to form covers for the two outer compartments 29 of the top tray 26. The top section 9 is provided with cross braces 54 which extend between and are secured at their ends to the side walls 11 to maintain said side walls in properly spaced apart parallel relation to one another to prevent said side walls from spreading apart or being drawn together to maintain the channels 13, 23, 24 and 25 properly spaced relative to one another for supporting the bottom section 14 and the three trays for free sliding movement relative to the upper section 29.

The compartments 29 of the three trays 26, 27 and 28 are adapted to contain fishing plugs and other artificial lures, not shown, and may also be utilized for holding hooks. If desired, some or all of the tray compartments 29 may be divided into several compartments by readily removable dividers 38 and 39, as best illustrated in Figures 4 and 5, each of which includes a side 40 disposed in the compartment 29 and which lies against one wall 41 of the compartment 29. The divider 38 is also provided with a side 42 which is disposed crosswise of the side 40 and which is of substantially triangular shape, as seen in Figure 3, and which is disposed crosswise of the channel or compartment 29 in which the divider 38 is placed to form a partition wall therein. The divider 39 has a similar transversely extending partition wall 43, as seen in Figure 3, which differs from the partition wall 42 in that said wall 43 has a concavely bowed upper edge 44 which is covered by a longitudinally folded cork strip 45, in which the barbed ends of fishhooks can be embedded.

A handle 46 is disposed on the upper side of the top wall 10, longitudinally thereof, and is swingably connected to said top wall by strap members 47.

The open ends of the top section 9 are each closed by a pair of hinged closures or doors 48, side flanges 49 of which are connected by hinges 50 to the side walls 11 so that the closures 48 are swingable outwardly about the hinges 50 to open positions from the closed positions thereof as illustrated in Figures 1 to 5. One of the closures of each pair of closures 48 is provided with a swingably mounted hasp 51 and the other closure 48 of each pair of closures has a turn-button 52 over which the slot 53 of the hasp can pass and which turn-button can be turned crosswise of the slot to connect the hasp to the closure 48 provided with the turn-button for latching the pair of closures in a closed position. It will be readily apparent that the trays 26, 27 and 28 are retained within the upper section 9 of the box 8 when the pairs of closures 48 are in closed positions, and as best seen in Figure 5, the bottom edges of the closures 48, when in closed positions, will bear against portions of the end walls 17 which are disposed above the rib 19, to retain the bottom section 14 immovably disposed directly beneath the top section 9.

It will be readily apparent that either pair of closures 48 may be unlatched and swung to an open position so that any one or more of the three trays 26, 27 and 28 may be then slidably extended through the exposed end of the top section 9, afforded by opening of the pair of closures 48 to afford ready access to articles, not shown, contained in the compartments 29 of the extended trays. Likewise, the bottom section 14 can be extended from the open end of the top section 9 or said top section 9 and the parts supported thereby can be slid relative to the bottom section 14, with a pair of the closures 48 in an open position, for exposing the open top 18 of the bottom section 14 to make readily available the articles, not shown, contained in said bottom section including the trough 20 thereof.

It will be readily apparent that the size of the tackle box 8 may be varied substantially and the box 8 may be provided with a greater or lesser number of trays than as illustrated. It will also be apparent that the cross sectional shape of the trays may be varied substantially.

For example, the trays may be of a cross sectional shape as illustrated in Figure 6 and wherein one of the modified trays 55 is shown having channel shaped compartments 56 each of which is provided with a relatively narrow flat bottom and upwardly diverging side walls. Figure 7 illustrates another modified form of the tray, designated generally 57, which differs from the trays 26, 27 and 28 only in that the longitudinally extending bottom edges 58 and top edges 59 of the tray compartments 60 are rounded in cross section rather than constituting sharp right angular bends as in the trays 26, 27 and 28, as best illustrated in Figure 3.

Various other modfications and changes are contemplated and may be resorted to without departing from the function or scope of the invention as hereinafter defined by the appended claims.

I claim as my invention:

1. A tackle box comprising an elongated body portion including a top wall and substantially parallel side walls extending downwardly from said top wall, inwardly opening guide channels secured to the inner sides of said side walls and extending longitudinally of the body portion and disposed in opposed relation to one another, a plurality of article supporting trays having side edge portions slidably engaging complementary guide channels of the side walls whereby said trays are slidably supported in said body portion in spaced apart superimposed relation to one another for individual sliding movement of the trays to an extended exposed position beyond an end of said body portion, means connected to said body portion for closing the ends thereof to retain the trays in retracted positions in the body portion, at least one of said end closure means being movably mounted relative to the body portion for movement to a position for exposing said body portion end for sliding movement of the trays to extended positions, said body portion constituting a top section of the tackle box, an elongated open top container comprising the bottom section of the tackle box and including side walls having longitudinally extending outwardly projecting ribs disposed adjacent the open top of the container, the bottom edge portions of the side walls of said top section being provided with inwardly opening channels in which said ribs of the bottom section slidably engage for slidably connecting said top and bottom sections for supporting the top section on the bottom section or for suspending the bottom section beneath the top section, said bottom section having end walls extending upwardly to above the level of the ribs and terminating below the level of the trays and engaged by said closure means to prevent sliding movement of the top and bottom sections relative to one another except when said movable closure means is in an open position.

2. A tackle box comprising a top section and a bottom section, said top section including an elongated arch shaped body portion having a top wall and substantially parallel side walls extending downwardly from said top wall, inwardly opening guide channels supported by and extending longitudinally of said side walls, article supporting trays having side edge portions slidably engaging complementary guide channels of the side walls and slidably supported thereby in said arch shaped body portion, means conected to said body portion for closing the ends thereof to retain the trays therein, at least one of said closure means being movably mounted relative to the body portion for sliding movement of the trays to extended positions; said bottom section comprising an elongated open top container including side walls having longitudinally extending outwardly projecting ribs disposed adjacent to the open top thereof and slidably engaging bottommost ones of said guide channels, said bottom section having end walls disposed between and engaging lower portions of said closure means to prevent sliding movement of the top and bottom sections relative to one another except when said movable closure means is in an open position, said end walls terminating below the level of said trays.

References Cited in the file of this patent

UNITED STATES PATENTS

| | | |
|---|---|---|
| 224,490 | Sturges | Feb. 10, 1880 |
| 743,429 | Benbow | Nov. 10, 1903 |
| 781,479 | Wierman | Jan. 31, 1905 |
| 891,110 | Stevens | June 16, 1908 |
| 1,984,345 | Kennedy | Dec. 11, 1934 |
| 2,584,886 | Laguzzi | Feb. 5, 1952 |
| 2,625,928 | Gould | Jan. 20, 1953 |
| 2,629,644 | Heys | Feb. 24, 1953 |
| 2,689,778 | Chambers et al. | Sept. 21, 1954 |